Patented Aug. 10, 1948

2,446,602

UNITED STATES PATENT OFFICE 2,446,602

DESTRUCTIVE HYDROGENATION OF HEAVY HYDROCARBON OILS

Joseph B. McKinley, Pittsburgh, and Harry J. Elder, Springdale, Pa., assignors to Gulf Research & Development Company, Pittsburgh, Pa., a corporation of Delaware No Drawing. Application February 17, 1947, Serial No. 729,198

7 Claims. (Cl. 196—53)

This invention relates to the destructive hydrogenation of heavy hydrocarbon oils and, more particularly, to the production of gasoline from heavy hydrocarbon oils by destructive hydrogenation.

Heavy hydrocarbon oils such as heavy cycle stocks, reduced crudes, and the heavy residues obtained from thermal cracking operations, such as pressure still tars and the like, are materials of low value. In order to convert such materials into more valuable products, destructive hydrogenation processes have been employed. A known method for the destructive hydrogenation of heavy petroleum oils in the liquid or mixed phase is to suspend in the heavy oil a destructive hydrogenation catalyst and to contact the suspension at elevated temperatures and pressures with hydrogen. A preferred type of catalyst for this operation is one which will suspend well in the heavy hydrocarbon oil to be converted. Thus, low density catalysts have been sought for this purpose, and it has been common practice to grind the catalysts to a relatively fine state of subdivision in order to lessen their tendency to settle out of suspension.

Nonvolatile, unsupported hydrogenation catalysts which have been used in the above-mentioned operation are ferric oxide, lead oxide, nickel oxide, molybdenum oxides or the corresponding sulfides of these metals. In general, the densities of these catalysts are such that even if they are finely ground, stable suspensions are not obtained. In order to counteract the tendency of such catalysts to settle out of suspension, the catalysts have been supported on low density carriers such as finely ground activated carbon or silica gel. However, the use of supported catalysts is not always desirable or convenient and in many instances, especially in commercial operation, the use of unsupported catalysts is more desirable from the standpoint of economy, ease of preparation and catalyst recovery.

Accordingly, it is an object of this invention to provide an unsupported catalyst for the destructive hydrogenation of heavy hydrocarbon oils, which catalysts will remain well suspended in the heavy oils to be converted.

It is a further object of this invention to convert heavy hydrocarbon oils by destructive hydrogenation in the presence of a hydrogenation catalyst in suspension in the oil, the catalyst having a low tendency to separate out of the suspension.

These and other objects are attained by the present invention wherein heavy hydrocarbon oils are converted into lower boiling, more valuable products by forming a fine suspension of molybdenum oxydihydroxydichloride in the heavy hydrocarbon oil, heating said suspension to liberate a substantial amount of hydrogen chloride thereby forming a hydrogenation catalyst in fine suspension in the heavy oil, and subjecting the resulting suspension to conditions of destructive hydrogenation in the presence of hydrogen.

More particularly, we have found that an unsupported hydrogenation catalyst may be dispersed in such manner in a heavy hydrocarbon oil that its tendency to settle out of the suspension is very low. Dispersion of the catalyst in the heavy hydrocarbon oil is accomplished by mixing such heavy oil with crystalline molybdenum oxydihydroxydichloride having the empirical formula $MoO_3.2HCl$ and forming a fine suspension thereof in the heavy oil by passing the mixture through a colloid mill. The resulting suspension is then heated with vigorous agitation to about 300° F. at which temperature the molybdenum oxydihydroxydichloride begins to volatilize and to decompose into molybdenum oxides and hydrogen chloride. The volatilization of the molybdenum oxydihydroxydichloride during its decomposition increases the degree of subdivision of the finely divided particles formed in the colloid mill and enhances the stability of the original suspension. When the resulting suspension is then subjected to destructive hydrogenation, excellent conversions are obtained.

In the decomposition of the molybdenum oxydihydroxydichloride during preparation of our catalyst, the hydrogen chloride, being gaseous, is partially evolved and may be recovered. A portion of the hydrogen chloride is generally consumed in hydrohalogenation reactions involving unsaturates present in the heavy oil. These latter reactions may be suppressed by flushing out the hydrogen chloride as it is formed by passing an inert gas such as methane or nitrogen through the suspension while it is being heated and agitated.

It is not necessary completely to decompose the molybdenum oxydihydroxydichloride. In carrying out the process of our invention, it is only necessary to heat the suspension of molybdenum oxydihydroxydichloride in the heavy oil, and preferably to flush out the evolved hydrogen chloride for such period of time as the hydrogen chloride is rapidly evolved. Generally, the easily recoverable hydrogen chloride, that is, the hydrogen chloride which is rapidly evolved, amounts to about 40 to 70 weight per cent of that theoretically available from the molybdenum oxydihydroxydichloride when the latter compound is considered to decompose according to the reaction:

$$MoO_3 \cdot 2HCl \rightarrow MoO_3 + 2HCl$$

To obtain additional hydrogen chloride it would be necessary to heat the suspension for an inordinately long time or to heat it at a higher temperature than about 300° F. It is uneconomical and therefore undesirable to continue heating at the lower temperature; and the use of a higher temperature than 300° F. is undesirable in view of the increasing tendency of the catalyst to settle as the temperature is raised. The retention of hydrogen chloride in the charge is not disadvantageous. On the contrary, we have found that the retained hydrogen chloride promotes the activity of the molybdenum oxides formed in the suspension. Accordingly, it appears that the catalyst of our invention contains molybdenum oxides, hydrogen chloride and some undecomposed molybdenum oxydihydroxydichloride.

Destructive hydrogenation in accordance with our invention may be carried out either batchwise or in a continuous manner. The latter is generally preferred in commercial application. The suspension of catalyst in heavy oil in the presence of hydrogen is normally subjected to a temperature in the range of from 800° to 900° F., preferably 825° F., and a pressure in the range of from 1000 to 3000 pounds per square inch gauge, preferably 2000 pounds, for a time sufficient to cause substantial destructive hydrogenation. The charge rate, expressed as space velocity, may vary from 0.2 to 2 volumes of heavy oil per volume of reactor space per hour. Hydrogen is employed in an amount varying from 2 to 10 per cent by weight of the heavy oil. The catalyst is employed in an amount of from 0.1 to 1.0 per cent by weight of the heavy oil.

In the various adaptations of the continuous process for destructive hydrogenation, the catalyst concentration is preferably not allowed to become greater than about 1.0 per cent by weight of the heavy oils to be destructively hydrogenated. Therefore, in continuous processes of destructive hydrogenation in accordance with our invention, substantially the same amount of catalyst is removed from the reactor as is introduced thereto in order to maintain the above stated limit of catalyst concentration. Accordingly, the reactor is so designed or operated as not to permit the accumulation of unvaporized liquid residues containing the suspended catalyst. The above applies to a single pass adaptation of the continuous process, as well as to that adaptation of the continuous process which involves recycle of the portion of the charge not converted to gasoline and gas. In this latter process, the catalyst is initially fed into the system with fresh feed but is recycled substantially in its entirety, so that the addition of fresh catalyst is continued only until the desired amount has been introduced into the system. At that time, no more catalyst is added with the fresh feed, except make-up catalyst to replace that lost and to replace that which may be removed from the recycle for regeneration as described below.

In preparing the fine suspension of catalyst in the fresh heavy oil charge to be destructively hydrogenated, it is, of course, unnecessary to pass the entire charge through the colloid mill. A relatively small portion of the fresh heavy oil may be mixed with the molybdenum oxydihydroxydichloride, passed through the colloid mill, and the resulting suspension mixed with the remainder of fresh heavy oil charge and then heated to form a fine suspension of the catalyst in the fresh heavy oil. Or, if desired, a relatively small portion of the fresh heavy oil charge may be mixed with the molybdenum oxydihydroxydichloride, passed through the colloid mill, heated to form a fine suspension of the catalyst, and then the remainder of the fresh heavy oil charge may be added. When only a portion of the fresh heavy oil charge is used in the preparation of the catalyst according to the above methods, such portion will usually be about 10 to 30 per cent by weight of the total fresh heavy oil charge. However, this amount is not critical and may vary in accordance with the capacity of the hydrogenation reactor and of the colloid mill, the catalyst requirements, and the type of operation employed, as will be understood by those skilled in the art.

An important advantage of the destructive hydrogenation process of our invention is the ease with which molybdenum oxydihydroxydichloride may be recovered in the process, thus reducing the cost of catalyst preparation and rendering the process practically self-sustaining from the standpoint of catalyst requirements. For example, in the continuous process of destructive hydrogenation with recycle in accordance with our invention, a fine suspension of molybdenum oxydihydroxydichloride in heavy oil is formed by passage through a colloid mill, and then the resulting suspension is subjected to a temperature of about 300° F. to liberate from about 40 to 70 per cent by weight of hydrogen chloride on the molybdenum oxydihydroxydichloride. The liberated hydrogen chloride is flushed out with an inert gas and is recovered for subsequent use. The suspension of catalyst in heavy oil is then passed through a reactor, such as a coil or reaction vessel, where it is contacted with hydrogen under the destructive hydrogenation conditions previously set forth to cause substantial destructive hydrogenation of the heavy oil. The products of the conversion are then passed into a high pressure separator wherein unconsumed hydrogen and gaseous hydrocarbons are separated from liquid products. The hydrogen in the separated gases is recovered and recycled to the reactor. The residue from the separator, still containing catalyst in suspension, is passed into a stripper, using steam as the stripping medium, where gasoline and gas oil are stripped off and passed overhead and the heavy hydrocarbon residue containing catalyst is recovered as bottoms. The overhead from the stripper is led into a fractionator where products in the gasoline boiling range, say up to 400° F., are removed overhead and recovered, and a gas oil residue is obtained which is recycled to the hydrogenation reactor and subjected to destructive hydrogenation. The heavy residue from the stripper which boils above the gas oil range, say above about 700° F., and which contains the partially spent catalyst in suspension, is also recycled to the reactor. As has been previously disclosed, the addition of other than make-up catalyst with the fresh feed is continued only until the desired catalyst concentration has been reached. As previously stated, the process of our invention may readily be made self-sustaining as far as catalyst requirements are concerned by continuously removing a portion of the partially spent catalyst from the heavy residual oil and burning-off the catalyst in a stream of an oxidizing gas such as air to convert it to molybdenum trioxide.

The molybdenum trioxide is then contacted at a temperature from about 400° to 500° F. with gaseous hydrogen chloride, preferably that which has been recovered from the catalyst preparation step set forth hereinabove, and is thus converted to molybdenum oxydihydroxydichloride from which the catalytic material for the operation is derived. This molybdenum oxydihydroxydichloride is then suspended in fresh heavy hydrocarbon oil to be converted and the cycle is repeated.

As an example of the destructive hydrogenation process of our invention, 0.39 per cent by weight of molybdenum oxydihydroxydichloride was mixed with a pressure still tar and the mixture passed through a colloid mill. The resulting fine suspension was heated to and maintained at 300° F. with vigorous agitation while bubbling nitrogen through the heated mass to flush out liberated hydrogen chloride. Stirring and heating were continued until 50 per cent of the theoretically available hydrogen chloride had been evolved. The resulting fine suspension of catalyst in the pressure still tar was then subjected to destructive hydrogenation at a temperature of 855° F. and at an average pressure of 2275 pounds per square inch gauge. The amount of hydrogen charged was 4.67 per cent by weight on the tar. The hydrogen consumption by weight on the tar was 1.04 per cent. There were obtained, by weight on the tar, 8.6 per cent of hydrocarbon gases, 19.3 per cent gasoline, 33.2 per cent gas oil, 38.6 per cent of a heavy oil residue boiling above the gas oil range and 0.3 per cent of coke.

The destructive hydrogenation process of our invention may be employed with excellent results on a wide variety of heavy hydrocarbon oils including heavy cycle stocks, reduced crudes, pressure still tars and other petroleum residues.

We claim:

1. A process for converting heavy hydrocarbon oils into lower boiling products which comprises forming a fine suspension of molybdenum oxydihydroxydichloride in a heavy hydrocarbon oil, heating said suspension to liberate a substantial amount of hydrogen chloride thereby forming a hydrogenation catalyst in fine suspension in the heavy oil, and subjecting the resulting suspension to destructive hydrogenation conditions in the presence of hydrogen.

2. A process for converting heavy hydrocarbon oils into lower boiling products which comprises forming a fine suspension of molybdenum oxydihydroxydichloride in a heavy hydrocarbon oil, heating and agitating said suspension to liberate a substantial amount of hydrogen chloride thereby forming a hydrogenation catalyst in fine suspension in the heavy oil, passing an inert gas through said suspension during said heating to remove the liberated hydrogen chloride from the suspension, and subjecting the resulting suspension to destructive hydrogenation conditions in the presence of hydrogen.

3. A process for converting heavy hydrocarbon oils into lower boiling products which comprises forming a fine suspension of molybdenum oxydihydroxydichloride in a heavy hydrocarbon oil in an amount of from 0.1 to 1.0 per cent by weight on the heavy hydrocarbon oil, heating and agitating said suspension at about 300° F. for a time sufficient to liberate from about 40 to 70 per cent by weight of hydrogen chloride based on the molybdenum oxydihydroxydichloride thereby forming a hydrogenation catalyst in fine suspension in the heavy oil, and subjecting the resulting suspension to destructive hydrogenation conditions in the presence of hydrogen.

4. A process for converting heavy hydrocarbon oils into lower boiling products which comprises forming a fine suspension of molybdenum oxydihydroxydichloride in a heavy hydrocarbon oil in an amount of from 0.1 to 1.0 per cent by weight on the heavy hydrocarbon oil, heating and agitating said suspension at about 300° F. for a time sufficient to liberate from about 40 to 70 per cent by weight of hydrogen chloride based on the molybdenum oxydihydroxydichloride thereby forming a hydrogenation catalyst in fine suspension in the heavy oil, passing an inert gas through said suspension during said heating to remove the liberated hydrogen chloride from the suspension, and subjecting the resulting suspension to destructive hydrogenation conditions in the presence of hydrogen.

5. A process for converting heavy hydrocarbon oils into lower boiling products which comprises forming a fine suspension of molybdenum oxydihydroxydichloride in a heavy hydrocarbon oil in an amount of from 0.1 to 1.0 per cent by weight on the heavy hydrocarbon oil, heating said suspension to liberate a substantial amount of hydrogen chloride thereby forming a hydrogenation catalyst in fine suspension in the heavy oil, subjecting the resulting suspension to destructive hydrogenation conditions in the presence of hydrogen, separating the products of said destructive hydrogenation into a gasoline fraction, a gas oil fraction, and a heavy residual oil boiling above the gas oil range and containing the catalyst in suspension, recovering said gasoline fraction, recycling said gas oil fraction to said destructive hydrogenation, removing a portion of the catalyst from said residual oil, recycling said residual oil containing the remainder of the catalyst to said destructive hydrogenation, converting the portion of catalyst removed from the residual oil into molybdenum trioxide, reacting said molybdenum trioxide with hydrogen chloride to form molybdenum oxydihydroxydichloride, forming a fine suspension of said molybdenum oxydihydroxydichloride in additional fresh heavy hydrocarbon oil to be converted, passing said suspension to the aforementioned catalyst forming step, and passing the resulting suspension of catalyst and additional fresh heavy hydrocarbon oil to be converted to said destructive hydrogenation in amounts sufficient to maintain the catalyst concentration in said destructive hydrogenation not greater than about 1.0 per cent by weight of the oils to be destructively hydrogenated.

6. The process of claim 5, wherein the molybdenum trioxide is reacted at an elevated temperature from about 400° F. to 500° F. with hydrogen chloride recovered from the step of heating the suspension of molybdenum oxydihydroxydichloride in a heavy hydrocarbon oil.

7. A process for converting heavy hydrocarbon oils into lower boiling products which comprises forming a fine suspension of molybdenum oxydihydroxydichloride in a heavy hydrocarbon oil, heating and agitating said suspension to liberate a substantial amount of hydrogen chloride thereby forming a hydrogenation catalyst in fine suspension in the heavy oil, passing an inert gas through said suspension during said heating to remove liberated hydrogen chloride from the suspension, subjecting the resulting suspension to contact with hydrogen under conditions of destructive hydrogenation including a temperature of from 800° to 900° F., a pressure of from 1000 to 3000 pounds per square inch gauge and a charge rate of from 0.2 to 2 volumes of oil per volume of reactor space per hour, and separating and recovering gasoline from the products of said destructive hydrogenation.

JOSEPH B. McKINLEY.
HARRY J. ELDER.

REFERENCES CITED

The following references are of record in the file of this patent:

UNITED STATES PATENTS

| Number | Name | Date |
|---|---|---|
| 2,068,868 | Pier et al. | Jan. 26, 1937 |
| 2,177,376 | Pier et al. | Oct. 24, 1939 |
| 2,194,186 | Pier et al. | Mar. 19, 1940 |
| 2,221,952 | Pier et al. | Nov. 19, 1940 |
| 2,291,308 | Harvey | July 28, 1942 |
| 2,291,311 | Harvey | July 28, 1942 |
| 2,350,828 | Schmerling | June 6, 1944 |